United States Patent
Arikere et al.

(10) Patent No.: US 12,337,696 B2
(45) Date of Patent: Jun. 24, 2025

(54) VEHICLE MOTION MANAGEMENT SYSTEM AND MOTION SUPPORT DEVICE CONTROL SYSTEM

(71) Applicant: VOLVO TRUCK CORPORATION, Gothenburg (SE)

(72) Inventors: Adithya Arikere, Gothenburg (SE); Sidhant Ray, Mölndal (SE); Leon Henderson, Härryda (SE); Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 240 days.

(21) Appl. No.: 18/252,794

(22) PCT Filed: Sep. 7, 2021

(86) PCT No.: PCT/EP2021/074584
§ 371 (c)(1),
(2) Date: May 12, 2023

(87) PCT Pub. No.: WO2022/100907
PCT Pub. Date: May 19, 2022

(65) Prior Publication Data
US 2024/0025267 A1    Jan. 25, 2024

(30) Foreign Application Priority Data
Nov. 16, 2020 (EP) .................... 20207778

(51) Int. Cl.
*B60L 15/20* (2006.01)
*B60T 8/17* (2006.01)
*B60T 8/172* (2006.01)

(52) U.S. Cl.
CPC ............ *B60L 15/20* (2013.01); *B60T 8/1708* (2013.01); *B60T 8/172* (2013.01);
(Continued)

(58) Field of Classification Search
CPC .... B60L 15/20; B60L 15/2072; B60L 15/209; B60L 2240/461; B60L 2240/463;
(Continued)

(56) References Cited

U.S. PATENT DOCUMENTS

| 10,723,229 B1 | 7/2020 | Yao et al. |
| 2003/0144777 A1 | 7/2003 | Schmitt |

(Continued)

FOREIGN PATENT DOCUMENTS

| CN | 108394313 B | 4/2020 |
| WO | 2017215751 A1 | 12/2017 |
| WO | 2021144010 A1 | 7/2021 |

OTHER PUBLICATIONS

International Search Report and Written Opinion of the International Searching Authority in corresponding International Application No. PCT/EP2021/074584 mailed Dec. 7, 2021 (12 pages).

(Continued)

*Primary Examiner* — Erick R Solis
(74) *Attorney, Agent, or Firm* — Venable LLP; Jeffri A. Kaminski

(57) ABSTRACT

A vehicle motion management (VMM) system for a heavy-duty vehicle, configured to obtain a desired wheel force value of a wheel of the vehicle; determine a torque limit for a first motion support device (MSD) associated with the wheel based on the desired wheel force value; determine a tire model based on a relationship between wheel force and wheel speed of the wheel; determine a desired wheel speed for the first MSD based on the tire model; and determine a torque fill request for a second MSD of the vehicle based on the desired wheel force and on a torque capability of the first MSD. The VMM system determines the torque fill request for the second MSD in dependence of the torque limit for the first MSD in case the operating torque of the first MSD is limited by the torque limit, and to determine the torque fill (Continued)

request for the second MSD in dependence of an applied torque status signal in case the operating torque of the first MSD is not limited by the torque limit.

12 Claims, 6 Drawing Sheets

(52) U.S. Cl.
CPC ... *B60L 2240/461* (2013.01); *B60L 2240/463* (2013.01); *B60L 2240/465* (2013.01); *B60L 2260/28* (2013.01); *B60T 2270/86* (2013.01)

(58) Field of Classification Search
CPC .. B60L 2240/465; B60T 8/1708; B60T 8/172; B60T 8/175; B60T 2270/86
USPC .......................................................... 701/90
See application file for complete search history.

(56) References Cited

U.S. PATENT DOCUMENTS

| | | |
|---|---|---|
| 2010/0114447 A1 | 5/2010 | Moriki et al. |
| 2011/0238251 A1* | 9/2011 | Wright ............ B60W 30/18172 701/22 |
| 2017/0174192 A1* | 6/2017 | Ying ..................... B60W 30/18 |
| 2018/0154777 A1 | 6/2018 | Hall et al. |
| 2021/0086623 A1 | 3/2021 | Yao et al. |
| 2022/0063575 A1* | 3/2022 | Laine ....................... B60T 8/172 |
| 2022/0153146 A1* | 5/2022 | Arikere ................. B60T 8/1708 |
| 2022/0153274 A1* | 5/2022 | Henderson ................ B60L 3/10 |
| 2024/0001928 A1* | 1/2024 | Ghandriz .................. B60T 1/10 |

OTHER PUBLICATIONS

International Preliminary Report on Patentability in corresponding International Application No. PCT/EP2021/074584 mailed Feb. 8, 2023 (6 pages).

* cited by examiner

VEHICLE MOTION MANAGEMENT SYSTEM AND MOTION SUPPORT DEVICE CONTROL SYSTEM

CROSS-REFERENCE TO RELATED APPLICATIONS

This application is a U.S. National Stage application of PCT/EP2021/074584, Sep. 7, 2021 and published on May 19, 2022 as WO 2022/100907, which claims the benefit of European Patent Application No. 20207778.0, filed Nov. 16, 2020, all of which are hereby incorporated by reference in their entireties.

TECHNICAL FIELD

The present disclosure relates to a vehicle motion management system and an associated actuator control system. The present disclosure also relates to a method as well as a control signal operable by a vehicle motion management system. The disclosed techniques are particularly applicable in electrically propelled vehicles. Although the disclosure will mainly be directed to a vehicle in the form of a truck using electric machines for both propulsion and braking, it may also be applicable to other types of vehicles.

BACKGROUND

A heavy-duty articulated vehicle is a complex dynamic mechanical system that is difficult to model accurately and that may quickly change behavior in response to e.g., a change in road friction conditions. The vehicle control often involves exchanging actuator control commands and actuator feedback signals between one or more central vehicle controllers and the different actuators of the vehicle via a digital interface, such as a controller area network (CAN) bus or an Ethernet connection. This interface may incur a significant delay in the vehicle control loops, which complicates vehicle motion management.

Heavy-duty vehicles have traditionally been controlled using torque request signals sent to motion support devices (MSDs) such as service brakes and propulsion devices over the above-mentioned types of digital interfaces. However, advantages may be obtained by instead controlling the actuators using wheel slip requests sent from a central vehicle controller to the different actuators. This moves the actuator control closer to the wheel end, and therefore allows for a reduced latency and a faster more accurate control of the MSDs. This type of approach is discussed in, e.g., WO 2017/215751 and also in WO 2021/144010.

Unfortunately for some, wheel slip-based control of a heavy-duty vehicle may change the general "feel" and handling of the vehicle. Drivers which are used to the torque-based command approach where a pedal input maps more or less directly to a torque request may therefore be reluctant to accept a wheel slip-based control. There is a general need for improved vehicle motion management systems for heavy-duty vehicles, which also at least to some extent preserve the vehicle handling and general feel associated with the classic torque-based actuator control approach.

SUMMARY

It is an object of the present disclosure to at least partially overcome the above-described deficiencies. This object is obtained by a vehicle motion management (VMM) system for a heavy-duty vehicle. The VMM system is connectable to a motion support device (MSD) control system for communication of control signals therebetween. The VMM system is configured to:
  obtain a parameter value relating to a desired wheel force of at least one wheel of the vehicle;
  determine a torque limit for a first MSD associated with the at least one wheel based on the parameter value relating to the desired wheel force;
  determine a tyre model based on a relationship between wheel force and wheel speed of the at least one wheel;
  determine a parameter value relating to a desired wheel speed for the first MSD associated with the at least one wheel based on the tyre model;
  determine a torque fill request for a second MSD of the heavy-duty vehicle based on the desired wheel force and on a torque capability of the first MSD; and
  transmit a control signal to the MSD control system. The control signal is arranged to, when executed by the MSD control system, cause the MSD control system to generate an operating torque by the first MSD to be executed subject to the torque limit and the desired wheel speed, and to generate an operating torque by the second MSD to be executed subject to the torque fill request.

Some of the VMM systems discussed herein are further configured to receive a limit status signal associated with the first MSD indicative of if the operating torque of the first MSD is limited by the torque limit, and to determine the torque fill request for the second MSD in dependence of the torque limit for the first MSD in case the operating torque of the first MSD is limited by the torque limit, and to determine the torque fill request for the second MSD in dependence of an applied torque status signal received from the first MSD in case the operating torque of the first MSD is not limited by the torque limit.

This means that the control loop delay incurred between the VMM system and the MSD controller is considerably decreased as long as the MSD is operating in the torque limited mode of operation, since the torque fill request is based without waiting for feedback from the MSD controller. However, as soon as the MSD enters into the speed-controlled mode of operation, i.e., as soon as the torque limit is no longer limiting the operation of the MSD, then the control loop reverts back to operating based on feedback. This increases the latency in the control loop, but at the same time provides for a more optimal operation on, e.g., varying friction road surfaces and the like. The limit status signal associated with the first MSD may, for instance, comprise an indication of if the first MSD is operating in a speed limited mode of operation and/or an indication of if the first MSD is operating at a motor axle speed within a predetermined margin from a requested motor axle speed.

The limit status signal associated with the first MSD is optionally also configured to account for operation at vehicle speeds below a low-speed threshold. This means that undesired effects due to low speed can be avoided. For instance, at very low speeds the determination of a wheel slip normalized to wheel speed may become difficult for numerical reasons (since the wheel slip formula comprises a division by the vehicle speed).

The tyre model is preferably based on a predetermined characteristic value of the at least one wheel. For instance, the tyre model can be based on a relationship between wheel force and wheel speed for a predetermined wheel characteristic of the at least one wheel. The tyre model can be determined specifically for a given wheel, accounting for effects due to, e.g., tyre wear, or it can be determined as a single model for all or a subset of the wheel son the vehicle. The tyre model may optionally also be based on a safety parameter indicative of a current operating condition of the vehicle, as will be discussed in more detail below.

According to some aspects, the parameter relating to the desired wheel speed is a desired wheel slip parameter. Thus, the vehicle has the capability to be wheel slip controlled. This way vehicle control can be shifted closer to the wheel end, where a higher bandwidth control is possible. This results in a better vehicle handling, especially during difficult road friction conditions.

According to some other aspects, the torque limit is determined independently from the determined tyre model. The torque limit, may, e.g., be determined from a driver pedal input signal.

There is also provided a vehicle motion management system for a vehicle, the vehicle motion management system being connectable to an actuator control system for communication of control signals therebetween, wherein the vehicle motion management system is configured to obtain a parameter value relating to a desired wheel force of at least one wheel of the vehicle; determine a torque limit for the at least one wheel based on the parameter value relating to the desired wheel force; determine a tyre model based on a relationship between wheel force and wheel speed of the at least one wheel; determine a parameter value relating to a desired wheel speed for the at least one wheel based on the tyre model; and transmit a control signal to the actuator control system, the control signal being arranged to, when executed by the actuator control system, cause the actuator control system to generate an operating torque to be executed subject to the torque limit and the desired wheel speed.

The vehicle motion management systems and the actuator control systems discussed herein are control systems of the vehicle, where each of the control systems is arranged to execute various control functionalities for controlling operation of the vehicle, in particular for controlling wheel operations. The vehicle motion management system is preferably configured to receive, and to determine wheel parameters in a higher layer, i.e., the vehicle motion management system determines a desired torque and wheel slip limit, also referred to as tyre slip limit, in a more generalized form, whereas the actuator control system is arranged as a lower layer control system configured to convert the parameters received from the vehicle motion management system to appropriate parameters for an actuator. The actuator control system takes e.g., current driveline state(s) into account before forwarding an actuator signal to the actuator. The current driveline state may, for example, relate to a current vehicle transmission state, such as a gear stage for the vehicle transmission or a transmission clutch actuation state.

The parameter value relating to a desired wheel force, also referred to as tyre force, should be construed as both relating to a desired wheel force as well as a desired wheel torque. The desired wheel force/torque is thus obtained in the form of a force/torque demand signal. The parameter value relating to the desired wheel force can be based on a request from a vehicle operator, i.e., the accelerator pedal or brake pedal position, or be based on a force demand signal from a system autonomously controlling propulsion operation of the vehicle, or from an advanced driver assistance system (ADAS). The torque limit could be determined based on the desired wheel force in combination with a margin value. Thus, the torque limit is set as a value corresponding to the desired torque plus a predetermined safety margin. As an alternative, the torque limit could be based on a torque request from the vehicle operator.

Also, the parameter value relating to a desired wheel speed should be construed as also relatable to a desired wheel slip for the at least one wheel of the vehicle. Wheel slip is the relative longitudinal motion between the wheel of the vehicle and the ground surface thereof, i.e., the amount of "skidding", i.e., a difference between the wheel speed over ground and the actual wheel speed. The wheel slip can be determined as a relationship between the longitudinal speed of the wheel and the rotational speed of the wheel taking the wheel radius into account. Accordingly, wheel slip is a parameter value relating to the wheel speed and is preferably defined in a wheel-based coordinate system.

Furthermore, the tyre model, which according to an example embodiment, is based on a predetermined characteristic value of the at least one wheel, defines a relationship between wheel force and wheel speed. The wheel speed can be defined relative to the ground, and normalized, i.e., the wheel slip, or be defined as an absolute rotational velocity. Thus, when defining a tyre model, a wheel force value for a specific wheel speed value can be obtained.

The tyre model can be a fixed tyre model, and/or a tyre model comprising estimated characteristics of the relationship between the wheel forces and the wheel speeds. As another alternative, the tyre model could be parameterized based on other factors, such as normal load on the tyre, type of tyre, wear, friction, etc.

By defining and transmitting a control signal indicative of a torque limit, the vehicle can be operated in a torque limit-based control mode as well as a speed-based control mode depending on the actual road condition. Hereby, when controlling the actuator to generate an operating torque based on the desired wheel speed, the torque limit will not be exceeded. The tyre model could thus preferably be defined to correspond to a relatively slippery road condition, i.e., a wet asphalt road or an icy road. By setting such a tyre model, the actuator will be operated in a torque limit control mode when driving on e.g., a dry road, etc., as the applied torque will hit the torque limit. On the other hand, when operating the vehicle on e.g., a slippery road or a dry road with large steering input, i.e., high lateral acceleration, the torque limit will not be reached, and the actuator will be operated in a wheel speed control mode.

According to an example embodiment, the tyre model may be based on a relationship between wheel force and wheel speed for a predetermined wheel characteristic of the at least one wheel. As indicated above, the predetermined wheel characteristic could be, for example, wheel normal load, friction between the wheel and the ground surface, the specific type of tyre, etc. Hereby, the tyre model could be modified based on various number of parameters.

According to an example embodiment, the tyre model may be based on a safety parameter indicative of a current operating condition of the vehicle. As indicated above, the tyre model could be based on a relatively slippery road condition. The safety parameter hereby enables the actuator to be mainly controlled in the torque limit control mode and operated in the wheel speed control mode only when the road condition is "more slippery" than the safety parameter has taken into consideration.

According to an example embodiment, and as indicated above, the parameter relating to the desired wheel speed may be a desired wheel slip parameter.

According to an example embodiment, the torque limit may be determined independently from the determined tyre model. An advantage is that the tyre model can be based on e.g., a slippery road condition or any other factor described above, and the torque limit can be freely determined based on e.g., a desired driving experience, etc.

According to an example embodiment, the tyre model may be a first tyre model, the vehicle motion management system being configured to determine a second tyre model, the second tyre model is based on an increased wheel force compared to the first tyre model for respective wheel speeds.

According to an example embodiment, the torque limit may be a first torque limit, the vehicle motion management system being configured to determine a second torque limit relating to a desired wheel speed based on the second tyre model, wherein the transmitted control signal is arranged to, when executed by the actuator control system, cause the actuator control system to generate the operating torque to be executed subject to the desired wheel speed and the first and second torque limits.

Using a first and a second tyre model, a range can be defined where one tyre model represents e.g., a slippery road condition, while the other tyre model represents e.g., a road condition with relatively high friction between the surface of the wheel and the road surface. The applied torque will thus not exceed an upper torque limit and not fall below a lower torque limit.

According to an example embodiment, the first and second tyre models may be determined based on a predetermined range between wheel force values for a specific wheel speed.

The predetermined range may be based on a desired torque where a range is set based on this desired torque, i.e., an upper safety margin and a lower safety margin.

In further detail, the upper torque limit may correspond to a desired torque plus a predetermined torque value, while the lower torque limit corresponds to the desired torque minus the predetermined torque value.

According to a second aspect, there is provided an actuator control system for a vehicle, the actuator control system being connectable to a vehicle motion management system and to at least one actuator configured to apply a torque on at least one wheel of the vehicle, wherein the actuator control system is configured to receive a control signal from the vehicle motion management system, the control signal being indicative of a torque limit and a parameter value relating to a desired wheel speed for the actuator; and transmit an actuator signal to the actuator for the actuator to generate an operating torque on the at least one wheel subject to the torque limit and the parameter value relating to the desired wheel speed.

The actuator control system of the second aspect thus receives the control signal described above in relation to the first aspect. An advantage of controlling the parameter relating to the wheel speed, such as the wheel slip, using the actuator control system is that the actuator control system is capable of rejecting rapid changing disturbances in the vehicle system. When, for example, operating the vehicle at a rough, bumpy road, the wheel slip can be kept within a substantially safe slip range. Effects of the second aspect are similar to the above description.

According to an example embodiment, the actuator signal may be configured to control the actuator to generate an operating torque without exceeding the torque limit. According to another example, the actuator signal may be configured to control the actuator to generate an operating torque above the lower torque limit described above in relation to the first aspect.

According to an example embodiment, the actuator control system may be configured to generate the operating torque based on a current vehicle driveline state for the vehicle.

The current driveline state should be construed as a current operating mode of the driveline, and in particular the transmission of the driveline. According to an example embodiment, the current vehicle driveline state may be one of a current vehicle transmission state, such as a gear stage for the vehicle transmission or a transmission clutch actuation state. Hereby, and as indicated above, the actuator control system is arranged as a lower layer control system configured to convert the parameters received from the vehicle motion management system to appropriate parameters for an actuator taking the current driveline state into consideration.

According to an example embodiment, the actuator control system may be a decentralized actuator control system connectable to a wheel specific actuator configured to control a single wheel of the vehicle.

Using a decentralized actuator control system enables for rapid response to the specific actuator it is connected to, which hence improves the operational propulsion/braking performance of the vehicle. The decentralized actuator control system can be connected to a separate vehicle motion management system, or connected to a central vehicle motion management system, which central vehicle motion management system is connected to a plurality of decentralized actuator control systems.

Further effects and features of the second aspect are largely analogous to those described above in relation to the first aspect.

According to a third aspect, there is provided a method for controlling an actuator of a vehicle, the actuator being configured to apply a torque on at least one wheel of the vehicle, wherein the method comprises: determining a parameter value relating to a desired wheel force of at least one wheel of the vehicle; determining a torque limit for the at least one wheel based on the parameter value relating to the desired wheel force; determining a tyre model based on a relationship between wheel force and wheel speed of the at least one wheel; determine a parameter value relating to a desired wheel speed for the at least one wheel based on the tyre model; and controlling the actuator to generate an operating torque on the at least one wheel subject to the torque limit and the parameter value relating to the desired wheel speed.

The various operations executed by the method of the third aspect should not be construed as limited to necessarily be executed by a specific one of the above-described vehicle motion management system or actuator control system. Conversely, the operations can be executed by either the vehicle motion management system or the actuator control system unless stated otherwise.

According to a fourth aspect, there is provided a control signal representing instructions to be executed by an actuator control system of a vehicle, the control signal comprising a wheel speed component representing instructions which, when executed by the actuator control system, cause the actuator control system to generate a parameter value associated with a desired wheel speed for a wheel of the vehicle; and a torque limit component representing instructions which, when executed by the actuator control system, cause the actuator control system to generate a maximum allowable torque limit for the wheel of the vehicle; wherein the actuator control system is adapted to execute an operating torque subject to the desired wheel speed and the maximum allowable torque limit.

According to a fifth aspect, there is provided a computer program comprising program code means for performing the steps of the third aspect when the program is run on a computer.

According to a sixth aspect, there is provided a computer readable medium carrying a computer program comprising program means for performing the steps of the third aspect when the program means is run on a computer.

Effects and features of the third, fourth, fifth, and sixth aspects are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
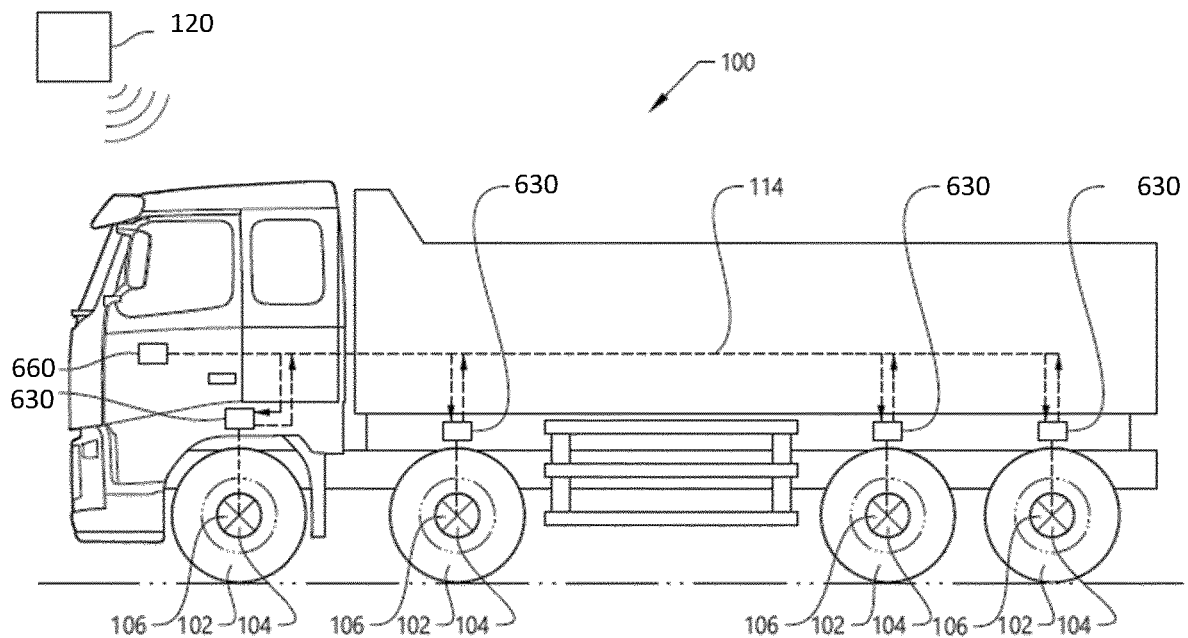
FIG. 1 is a lateral side view illustrating an example heavy-duty vehicle.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 3:
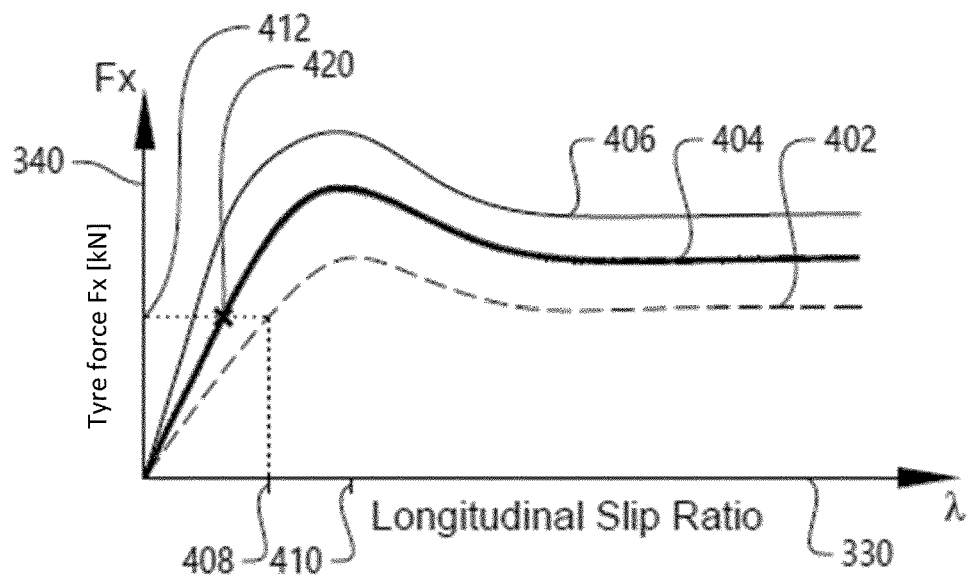
FIGS. 3-5 are graphs illustrating example models.
Figure 4:
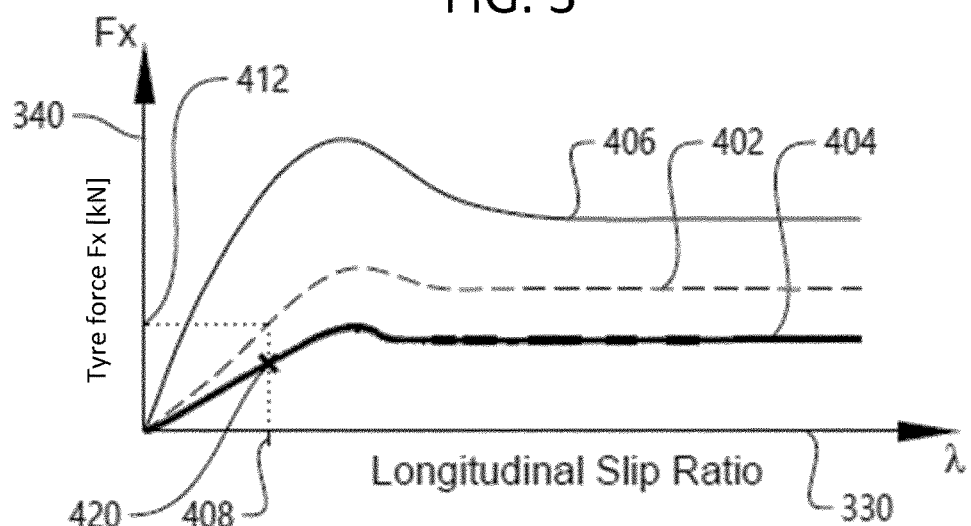
Figure 5:
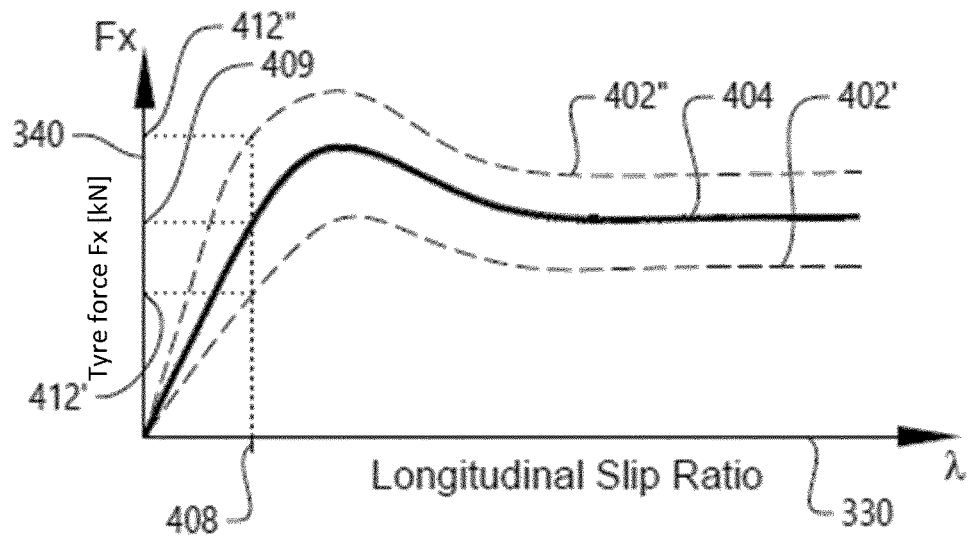

With reference to FIG. 1, there is depicted a vehicle 100 in the form of a truck. The vehicle comprises a plurality of wheels 102, wherein each of the wheels 102 comprises a respective motion support device (MSD) 104. Although the embodiment depicted in FIG. 1 illustrates an MSD for each of the wheels 102, it should be readily understood that e.g., one pair of wheels 102 may be arranged without such an MSD 104. Also, an MSD may be arranged connected to more than one wheel, e.g., via a differential arrangement. Further, the MSDs 104 are preferably MSDs for generating a torque on a respective wheel of the vehicle or for both wheels of an axle. The MSD may be a propulsion device, such as an electric machine 106 arranged to e.g., provide a longitudinal wheel force to the wheel(s) of the vehicle 100, as depicted in FIGS. 3-5 and described further below. Such an electric machine may thus be adapted to generate a propulsion torque as well as to be arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

Moreover, each of the MSDs 104 is connected to a respective MSD control system 630 arranged for controlling operation of the MSD 104. The MSD control system 630 is preferably a decentralized motion support system 630, although centralized implementations are also possible. It is furthermore appreciated that some parts of the MSD control system may be implemented on processing circuitry remote from the vehicle, such as on a remote server 120 accessible from the vehicle via wireless link. Still further, each MSD control system 630 is connected to a vehicle motion management (VMM) system or function 660 of the vehicle 100 via a data bus communication arrangement 114 that can be either wired, wireless or both wired and wireless. Hereby, control signals can be transmitted between the vehicle motion management system 660 and the MSD control system 630. The vehicle motion management system 660 and the MSD control system 630 will be described in further detail below with reference to FIG. 6.

Generally, the MSDs on the vehicle 100 may also be realized as, e.g., a friction brake, a power steering device, active suspension, and the like. Notably, these MSDs are often coordinated in order to obtain a desired motion by the vehicle. For instance, two or more MSDs may be used jointly to generate a desired propulsion torque or braking torque.

It is appreciated that the herein disclosed methods and control units can be applied with advantage also in other types of heavy-duty vehicles, such as trucks with drawbar connections, construction equipment, buses, and the like. The vehicle 100 may also comprise more than two vehicle units, i.e., a dolly vehicle unit may be used to tow more than one trailer.

The VMM system 660 as well as the MSD control system 630 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. Implementation aspects of the different vehicle unit processing circuits will be discussed in more detail below in connection to FIG. 10.

Figure 2:
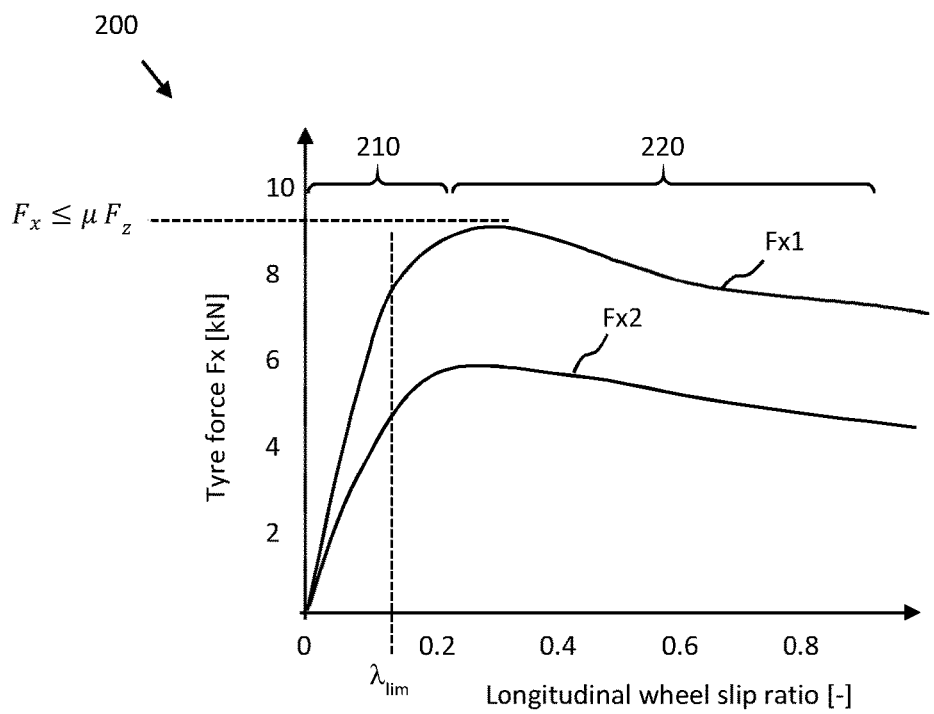
FIG. 2 is a graph showing example tyre forces as function of wheel slip.

FIG. 2 is a graph showing an example 200 of achievable tyre force as function of longitudinal wheel slip. Longitudinal wheel slip $\lambda_x$ may, in accordance with SAE J670 (SAE Vehicle Dynamics Standards Committee Jan. 24, 2008) be defined as $$\lambda_x = \frac{R\omega_x - v_x}{\max(|R\omega_x|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel. The VMM 660 and optionally also the MSD control system 630 optionally maintains information on $v_x$ (in the reference frame of the wheel), while a wheel speed sensor or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable lateral tyre force $F_y$ by the wheel since, normally, $F_x \leq \mu F_z$, where $\mu$ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

The longitudinal tyre force Fx1, Fx2 shows an almost linearly increasing part 210 for small wheel slips, followed by a part 220 with more non-linear behavior for larger wheel slips. The tyre model Fx1 is representative of a high friction scenario, i.e., dry road with good tyres, while Fx2 is representative of a reduced friction scenario. Note that the achievable tyre force drops with $\mu$.

It is desirable to maintain vehicle operation in the linear region 210, where the obtainable longitudinal force in response to an applied brake command is easier to predict, and where enough lateral tyre force can be generated if needed. To ensure operation in this region, a wheel slip limit $\lambda_{lim}$ on the order of, e.g., 0.1, can be imposed on a given wheel. For larger wheel slips, e.g., exceeding 0.1, a more non-linear region 220 is seen. Control of a vehicle in this region may be difficult and is therefore often avoided. It may be interesting for traction in off-road conditions and the like where a larger slip limit for traction control might be preferred, but not for on-road operation.

A tyre model, also referred to as an inverse tyre model or a tyre mapping, which will be discussed in more detail in connection to FIGS. 3-5 below, can be used to translate between a desired longitudinal tyre force $F_{xi}$ and wheel slip. The interface between VMM and MSDs capable of delivering steering and optionally also torque to the vehicle's wheels has, traditionally, been focused on torque-based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Significant benefits can be achieved by instead using a wheel speed or wheel slip-based request on the interface between VMM 660 and the MSD controller or controllers 630, thereby shifting the difficult actuator speed control loop to the MSD controllers, which generally operate with a much shorter sample time compared to that of the VMM function. Such an architecture can provide much better disturbance rejection compared to a torque-based control interface and thus improves the predictability of the forces generated at the tyre road contact patch.

Figure 6:
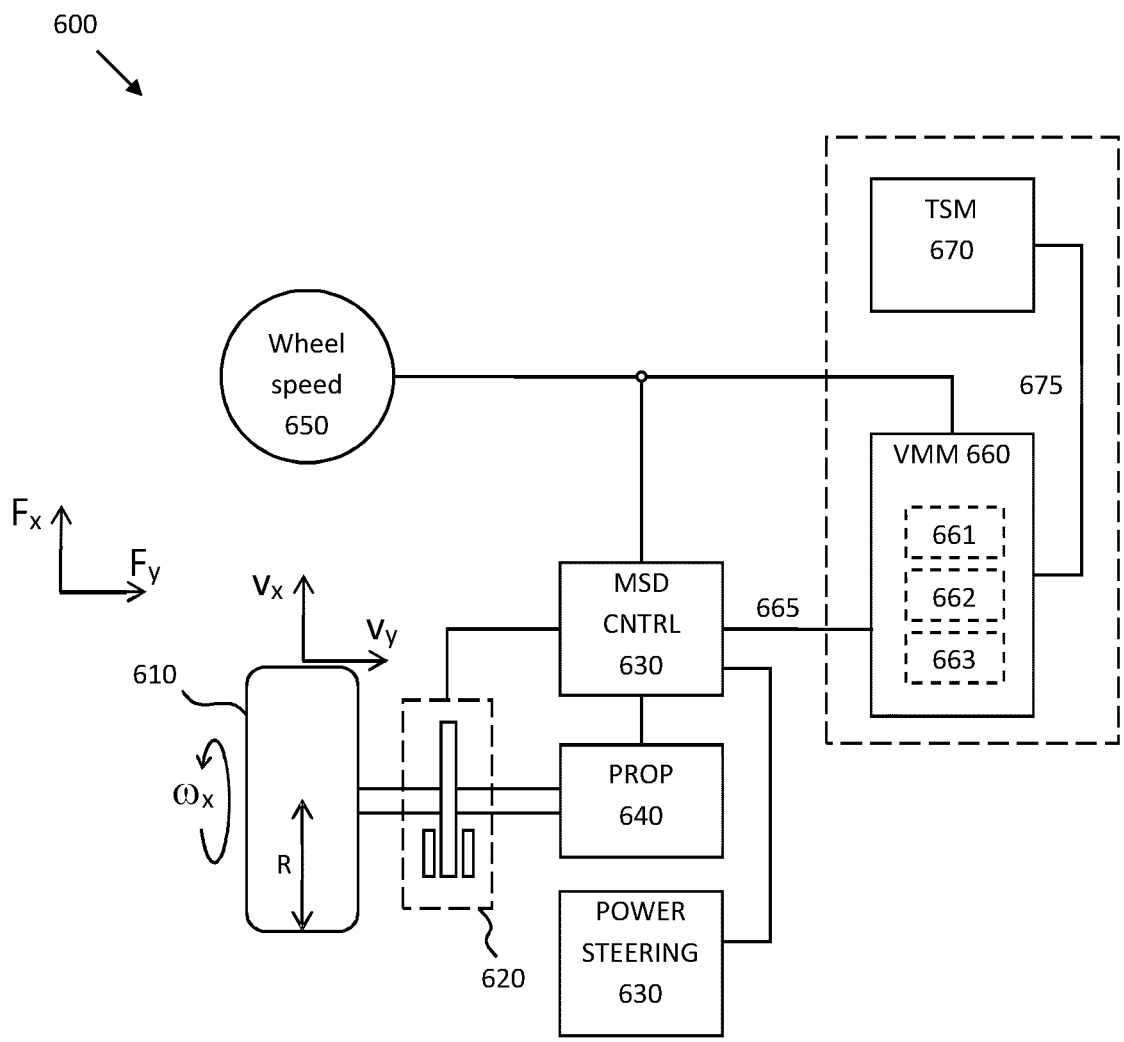
FIG. 6 shows an example motion support device control arrangement.

Turning now to FIG. 6, the overall vehicle control system 600 may be implemented on one or more vehicle unit computers (VUC). The VUC may be configured to execute vehicle control methods which are organized according to a layered functional architecture where some functionality may be comprised in a traffic situation management (TSM) domain 670 in a higher layer and some other functionality may be comprised in a vehicle motion management (VMM) domain 660 residing in a lower functional layer.

FIG. 6 schematically illustrates functionality 600 for controlling an example wheel 610 on the vehicle 100 by some example MSDs here comprising a friction brake 620 (such as a disc brake or a drum brake), a propulsion device 640 and a steering arrangement 630. The friction brake 620 and the propulsion device are examples of wheel torque generating devices, which can be controlled by one or more motion support device control units 630. The control is based on, e.g., measurement data obtained from a wheel speed sensor 650 and from other vehicle state sensors 670, such as radar sensors, lidar sensors, and also vision based sensors such as camera sensors and infra-red detectors. An MSD control system 630 may be arranged to control one or more actuators. For instance, it is not uncommon that an MSD control system 630 is arranged to control both wheels on an axle.

The TSM function 670 plans driving operation with a time horizon of 10 seconds or so. This time frame corresponds to, e.g., the time it takes for the vehicle 100 to negotiate a curve or the like. The vehicle maneuvers, planned and executed by the TSM function, can be associated with acceleration profiles and curvature profiles which describe a desired target vehicle velocity in the vehicle forward direction and turning to be maintained for a given maneuver. The TSM function continuously requests the desired acceleration profiles $a_{req}$ and steering angles (or curvature profiles $c_{req}$) from the VMM function 260 which performs force allocation to meet the requests from the TSM function in a safe and robust manner. The VMM function 660 operates on a timescale of below one second or so and will be discussed in more detail below.

The wheel 310 has a longitudinal velocity component $v_x$ and a lateral velocity component $v_y$. There is a longitudinal wheel force $F_x$ and a lateral wheel force $F_y$, and also a normal force $F_z$ acting on the wheel (not shown in FIG. 3). Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The wheel has a rotational velocity $w_x$, and a radius R.

The type of tyre model 200 shown in FIG. 2 can be used by the VMM 660 to generate a desired tyre force at some wheel. Instead of requesting a torque corresponding to the desired tyre force, the VMM can translate the desired tyre force into an equivalent wheel slip (or, equivalently, a wheel speed relative to a speed over ground) and request this slip instead. The main advantage being that the MSD control device 630 will be able to deliver the requested torque with much higher bandwidth by maintaining operation at the desired wheel slip, using the vehicle speed $v_x$ and the wheel rotational velocity $\omega_x$, obtained, e.g., from the wheel speed sensor 650. The vehicle speed $v_x$ can be obtained from various vehicle sensors such as radar, lidar, and vision-based sensor in combination with a global positioning system (GPS) receiver and the like.

The control unit or units can be arranged to store a pre-determined inverse tyre model $f^{-1}$ in memory, e.g., as a look-up table. The inverse tyre model is arranged to be stored in the memory as a function of the current operating condition of the wheel 610. This means that the behavior of the inverse tyre model is adjusted in dependence of the operating condition of the vehicle, which means that a more accurate model is obtained compared to one which does not account for operating condition. The model which is stored in memory can be determined based on experiments and trials, or based on analytical derivation, or a combination of the two. For instance, the control unit can be configured to access a set of different models which are selected depending on the current operating conditions. One inverse tyre model can be tailored for high load driving, where normal forces are large, another inverse tyre model can be tailored for slippery road conditions where road friction is low, and so on. The selection of a model to use can be based on a pre-determined set of selection rules. The model stored in memory can also, at least partly, be a function of operating condition. Thus, the model may be configured to take, e.g., normal force or road friction as input parameters, thereby obtaining the inverse tyre model in dependence of a current operating condition of the wheel 610. It is appreciated that many aspects of the operating conditions can be approximated by default operating condition parameters, while other aspects of the operating conditions can be roughly classified into a smaller number of classes. Thus, obtaining the inverse tyre model in dependence of a current operating condition of the wheel 610 does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, the mapping between tyre force and wheel slip changes in some way in dependence of the operating condition, which improves the precision of the mapping.

The inverse tyre model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

Inverse tyre models can be automatically configured from the remote server 120, e.g., as software updates, or manually by a technician performing vehicle routine servicing.

As noted above, the type of wheel slip-based control discussed in connection to FIG. 2 may not be desired by some drivers who are used to traditional torque-based MSD control, since it will alter the general feel of the vehicle controls. To provide a traditional feel during normal driving conditions, and still reap the benefits of wheel slip or wheel speed-based control, it is proposed herein to send a torque limit as well as a wheel slip request to the MSD of a given wheel. The torque limit is determined based on a mapping from pedal position, e.g., via a look-up table or the like, while the wheel slip request is determined from a tyre model such as that discussed in connection to FIG. 2 above. Now, if the wheel slip request is determined based on a low friction tyre model, like Fx2 in FIG. 2, then then torque limit based on the pedal position will be the limiting factor governing MSD operation during normal road conditions (dry road—normal friction). However, if the vehicle encounters low friction conditions, or otherwise experiences a reduction in achievable wheel force, then the torque limit will no longer be the limiting factor, and the MSD will instead hit the wheel slip request. This way, a traditional vehicle handling can be maintained during normal driving conditions, and a wheel slip-based vehicle motion management will be automatically activated if road friction conditions change. The concept will be discussed in more detail below, in connection to FIGS. 3-5.

Figure 7A:
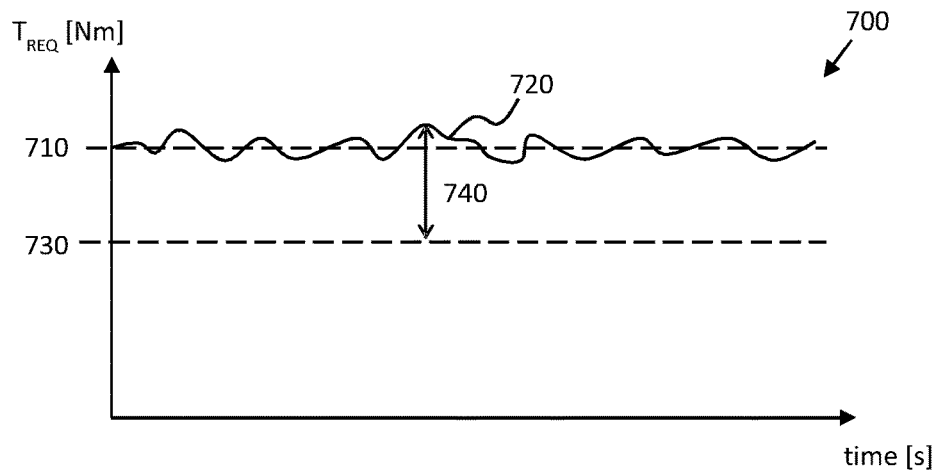
FIGS. 7A-C schematically illustrate an example torque fill operation.

Many propulsion systems comprise more than one torque generating device, i.e., a collection of electric machines and friction brakes arranged to generate negative torque, and/or a collection of electric machines arranged to generate positive torque. FIG. 7A shows a graph 700 of an example operation according to the techniques disclosed herein. The graph shows torque (in Newton-meters) vs. time (in seconds). The VMM 660 determines a total torque request 710 for controlling a wheel of the vehicle, e.g., based on the pedal position of a driver or on an input from an ADAS or an autonomous drive (AD) system. It is an overall goal of the MSD control system 630 to deliver this requested torque. As discussed above, fast wheel slip-based control of the wheel is desired, resulting in fast variation of the applied torque 720 around the total torque request level, at least during difficult friction conditions. If the total torque request 710 exceeds the torque capability of a single electrical machine, then additional torque generating devices can be activated. However, to keep the different devices from competing against each other, it is preferred to let one device handle the wheel slip control (fast actuation), while the other devices instead provide a more stable baseline torque 730, configured at a value some margin 740 from the current applied torque by the speed-controlled or slip-controlled electric machine. The wheel slip controlled device may be referred to as a speed-controlled device, while the other devices are torque controlled devices. This way of generating torque may be referred to as torque fill, since the other devices fill up the torque not possible to generate by the single device performing the wheel slip control.

Both positive (propulsion) and negative (braking) torques can be subject of torque fill. I.e., torque fill can be used to compensate for lack in braking capability by an electric machine, as well as a deficiency in propulsion torque.

Figure 7B:
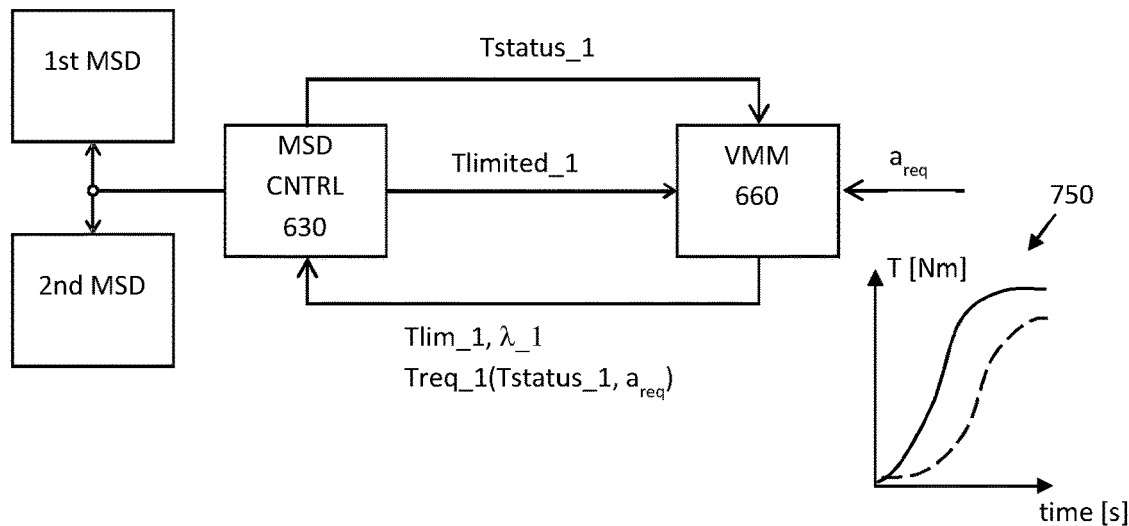

A problem with this torque filling approach is that the VMM function 660 must wait for a torque feedback from the speed-controlled device that is applying the varying torque 720, before sending out the baseline torque request 730 to the torque-controlled devices. Since, if the VMM function 660 does not know the torque applied by the speed-controlled machine, it cannot determine the deficiency with respect to the total torque necessary to generate the desired motion by the vehicle. This lead-time incurs a control loop delay, which may be experienced by a driver as a lag or an increased response time to a command input such as depressing the acceleration pedal. FIG. 7B illustrates the problem. An MSD control system 630 is controlling a first and a second torque generating device (the 1$^{st}$ MSD and the 2$^{nd}$ MSD in FIG. 7B) in a torque fill operation. The first MSD may, e.g., be an electric machine, while the second MSD may, e.g., be a second electric machine or a friction brake.

The VMM system 660 sends a control signal to the MSD control system 630 which comprises a torque limit (Tlim_1) and a desired wheel speed or slip λ_1 as discussed above. The control signal is arranged to, when executed by the MSD control system 630, cause the MSD control system 630 to generate an operating torque by the first MSD to be executed subject to the torque limit and the desired wheel speed as discussed above.

As an example, when multiple motors are simultaneously used to drive the vehicle, the torque fill concept can be used to run one of the motors in speed control while the others are run in torque mode with their torque requests being "slave" to the torque status achieved by the speed motor. While this solves the motor control issue of ensuring that the motors don't work against each other (which they can if multiple of them are simultaneously in speed control mode), it increases the latency in torque response to driver accelerator or brake pedal demand. This is due to the fact that the torque fill feedback loop involving the torque status of the speed motor and the torque requests for the torque motors normally all occur over CAN which has significant latencies. These latencies can add up to a feeling of reduced responsiveness to driver accelerator pedal input.

In FIG. 7B, the VMM system 660 receives an applied torque status signal comprising continuous updates of currently applied torque by the first MSD (Tstatus_1). The VMM system 660, knowing the torque applied by the first MSD, can then determine a baseline torque request Treq_1 as function of the applied torque status signal Tstatus_1 and the vehicle control input, such as an acceleration request $a_{req}$. This is shown in FIG. 7B by the signal Treq_1 (Tstatus_1, $a_{req}$). An advantage with this approach is that both MSDs are effectively torque controlled (one is speed controlled but torque limited) during normal friction conditions but enter into a wheel slip controlled mode or a speed-controlled mode if road friction conditions change. A drawback, however, is that the lead time incurred in waiting for the applied torque status signal Tstatus_1 causes a sluggish response by the vehicle to a control input, which is undesired. This sluggish response is illustrated in the insert 750, where the desired torque is shown as a solid line, and the generated torque is shown by the dashed line.

Figure 7C:
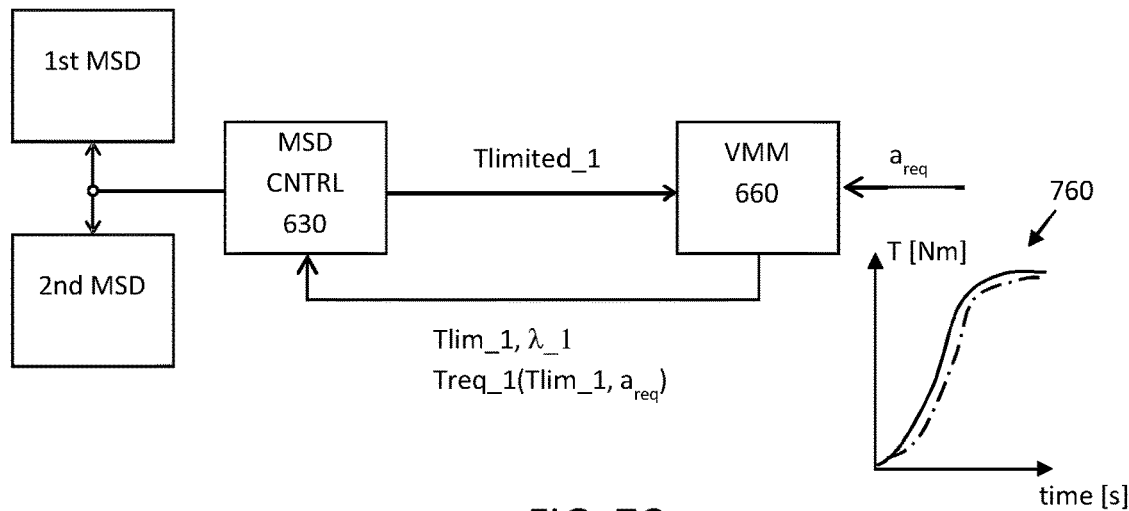

The present teaching builds on the realization that a limit status signal (Tlimited_1) associated with the first MSD and indicative of if the operating torque of the first MSD is limited by the torque limit can be used to improve the delay in the torque fill control loop. As long as the first MSD is limited by the torque limit, the VMM function 660 will just distribute the driver request $a_{req}$ as a torque limit to the speed-controlled device and a torque request to the torque-controlled device, without waiting for the feedback signal Tstatus_1 from the speed-controlled device. The torque distribution can, e.g., be determined based on a look-up table or the like. However, as soon as the first MSD becomes speed limited (as indicated by the limit status signal Tlimited_1), i.e., hits the slip request instead of the torque limit, then the VMM function 660 enters into the torque filling mode where it waits for the torque status Tstatus_1 from the speed-controlled device before setting the torque level of the torque-controlled device. The system operation when in torque limited mode of operation is illustrated in FIG. 7C, and the faster response to control inputs is shown in the insert 760, where the desired torque is shown as a solid line, and the generated torque is shown by the dash-dotted line. Note that, in FIG. 7C, the signal from the VMM 660 to the MSD controller 630 is sent as Treq_1 (Tlim_1, $a_{req}$) as opposed to Treq_1(Tstatus_1, $a_{req}$) in FIG. 7B.

To summarize, there is disclosed herein a vehicle motion management (VMM) system 660 for a heavy-duty vehicle. The VMM system 660 is connectable to a motion support device (MSD) control system 630 for communication of control signals therebetween.

The VMM system is configured to:
obtain a parameter value relating to a desired wheel force of at least one wheel of the vehicle;
determine a torque limit for a first MSD associated with the at least one wheel based on the parameter value relating to the desired wheel force;
determine a tyre model based on a relationship between wheel force and wheel speed of the at least one wheel;
determine a parameter value relating to a desired wheel speed for the first MSD associated with the at least one wheel based on the tyre model;
determine a torque fill request for a second MSD of the heavy-duty vehicle 100 based on the desired wheel force and on a torque capability of the first MSD; and
transmit a control signal to the MSD control system 630, the control signal being arranged to, when executed by the MSD control system 630, cause the MSD control system 630 to generate an operating torque by the first MSD to be executed subject to the torque limit and the desired wheel speed, and to generate an operating torque by the second MSD to be executed subject to the torque fill request,
wherein the VMM system 660 is further configured to:
receive a limit status signal associated with the first MSD indicative of if the operating torque of the first MSD is limited by the torque limit, and to
determine the torque fill request for the second MSD in dependence of the torque limit for the first MSD in case the operating torque of the first MSD is limited by the torque limit, and to determine the torque fill request for the second MSD in dependence of an applied torque status signal received from the first MSD in case the operating torque of the first MSD is not limited by the torque limit.

The proposed VMM system can also be described as a VMM system for a heavy-duty vehicle configured to:
obtain a desired wheel force value of at least one wheel of the vehicle;
determine a torque limit for a first motion support device (MSD) associated with the at least one wheel based on the desired wheel force value;
determine a tyre model based on a relationship between wheel force and wheel speed of the at least one wheel;
determine a desired wheel speed for the first MSD based on the tyre model; and
determine a torque fill request for a second MSD of the heavy-duty vehicle based on the desired wheel force and on a torque capability of the first MSD, wherein the VMM system is further configured to:
determine the torque fill request for the second MSD in dependence of the torque limit for the first MSD in case the operating torque of the first MSD is limited by the torque limit, and to determine the torque fill request for the second MSD in dependence of an applied torque status signal received from the first MSD in case the operating torque of the first MSD is not limited by the torque limit.

According to aspects, the limit status signal associated with the first MSD comprises an indication of if the first MSD is operating in a speed limited mode of operation.

According to aspects, the limit status signal associated with the first MSD comprises an indication of if the first MSD is operating at a motor axle speed within a predetermined margin from a requested motor axle speed.

According to aspects, the limit status signal associated with the first MSD is configured to account for operation at vehicle speeds below a low speed threshold.

Referring back to FIG. 6, according to a non-limiting example, the vehicle motion management system 660 comprises a torque module 661, a mapping module 662 and a wheel speed module 663. The vehicle motion management system 660 is further arranged to receive vehicle operation signal(s) 675 which comprises data to be operated on the vehicle motion management system 660 and its various modules 661, 662, 663. The vehicle operation signal(s) 675 provided to the vehicle motion management system 660 may, for example, comprises data in the form of signal(s) indicative of a parameter value relating to a desired wheel force of at least one of the wheels of the vehicle, a current environment of the vehicle, a current traffic situation, vehicle weight parameter, such as e.g. if the vehicle is laden, unladen, partially laden, and/or the topology of the road at which the vehicle is presently operating, etc. The vehicle motion management system 660 may also receive other signals indicative of specific vehicle conditions, such as e.g., a current vehicle operating condition as will be described below. The torque module 661, the mapping module 662 and the wheel speed module 663 are configured to transmit communication signals between one another, i.e., the different modules are configured to communicate with each other as will be evident by the following disclosure. It should be readily understood that the torque module 661, the mapping module 662 and the wheel speed module 663 are illustrated as separate components merely for illustrative purposes. The vehicle motion management system 660 may of course also simply comprise various control functionalities itself which executes the below described functionalities.

The following will now describe the functional operation of the vehicle motion management system 660. In particular, the vehicle motion management system 660 is arranged to obtain a parameter value relating to the desired wheel force of at least one wheel 102 of the vehicle. The parameter is preferably provided as data incorporated in the above-described vehicle operation signal 675, and preferably received by the torque module 661. The parameter should be construed as being either a desired wheel force and/or a desired wheel torque, which is based on a requested demand from e.g., a vehicle operator, a system for autonomously controlling the vehicle, an ADAS system, etc. In the case of requested demand from the vehicle operator, the signal may be based on an accelerator pedal position or a brake pedal position.

Based on the parameter value relating to the desired wheel force, the torque module 661 determines a torque limit for the at least one wheel 102. Various alternatives of determining the torque limit will be described in further detail below with reference to the description of FIG. 5.

Moreover, the mapping module 662 is configured to determine a tyre model (see e.g., 402 in FIGS. 3 and 4) defining a relationship between wheel forces and wheel speed of the at least one wheel 102. The wheel speed can be defined relative to the ground, and normalized, i.e., a wheel slip, or be defined as an absolute rotational velocity.

The tyre model thus defines longitudinal wheel forces for specific wheel speeds and can be based on an estimated characteristic of the relationship between the wheel forces and the wheel speed. For example, the tyre model can be based on an assumption of a slippery road surface, where the wheel force for a specific wheel speed is lower compared to the wheel force for the same wheel speed of a dry road surface. The tyre model can also be based on a normal load exposed to the tyre, the specific tyre currently used, an expected wear of the tyre, an estimated friction level between the tyre and the road surface, etc. According to further examples, the tyre model can also be based on a predetermined characteristic value of the at least one wheel, a relationship between wheel force and wheel speed for a predetermined wheel characteristic of the at least one wheel, as well as based on a safety parameter indicative of a current operating condition of the vehicle.

Based on the tyre model determined by the mapping module 662, the wheel speed module 663 is configured to determine a parameter value relating to a desired wheel speed for the at least one wheel 102 of the vehicle 100. The parameter relating to the desired wheel speed may correspond to the desired wheel speed or to a desired wheel slip. Hence, as the desired wheel force has been obtained, the wheel speed module 663 can map this wheel force, using the tyre model, to a desired wheel speed/wheel slip.

When the torque limit and the desired wheel speed have been determined, the vehicle motion management system 660 transmits a control signal 665 comprising data indicative of the torque limit and the desired wheel speed to the actuator control system 630.

The actuator control system 630 thus receives the control signal 665 from the vehicle motion management system 660. As described above, the control signal is indicative of a torque limit and a parameter value relating to a desired wheel speed for the actuator. The actuator control system 630 thereafter transmits an actuator control signal to the actuator 104 for controlling operation thereof, in particular for controlling the actuator 104 to generate an operating torque on the at least one wheel to obtain the desired wheel speed but without exceeding the torque limit.

Hereby, during operation of the vehicle 100, the actuator 104 will be operated in a torque limit control mode when driving on e.g., a dry road, as the applied torque will hit the torque limit, and when driving on a more slippery road, the actuator 104 will be operated in a wheel speed control mode as the torque limit will not be reached.

The actuator control system 630 may also be arranged to obtain a signal indicative of a current driveline state of the vehicle 100. The current driveline state can, for example, relate to a current vehicle transmission state, a gear stage for the vehicle transmission, a transmission clutch actuation state, etc. The operating torque determined by the actuator control system 630 can thus also be based on the current driveline state.

In order to present example embodiments of the present disclosure, reference is made to FIGS. 3-5 which illustrate graphs depicting various examples of the model representing the relationship between wheel slip and tyre forces. In each of FIGS. 3-5, the vertical axis 340 represents the tyre force generated between the surface supporting the wheel 102 and the wheel 102, while the horizontal axis 330 represents the longitudinal wheel slip of the wheel 102. It should be observed that the X-axis, i.e., the axis defining the longitudinal wheel slip should be construed as equally as well relate to the longitudinal wheel speed of the wheel, as wheel slip is a parameter value relating to the wheel speed. Furthermore, FIGS. 3-5 depicts a propulsion scenario, i.e., where the tyre forces are positive. The present disclosure is of course also applicable for a scenario where the tyre forces are negative, i.e., during deceleration, which would correspond to a graph mirrored in relation to the X- and Y-axis of FIGS. 3-5.

Reference is initially made to FIG. 3, which is a graph illustrating a first example embodiment of the model representing a relationship between wheel slip and tyre forces. As can be seen in dashed lines, the tyre model 402 is determined based on any of the above-described examples. FIG. 3 also depicts an actual tyre model 404, i.e., the actual relationship between the wheel slip and tyre forces, as well as an expected model 406 for a dry road surface and substantially unused tyres, i.e., a very good grip between the tyre and the road surface.

The tyre model 402 thus corresponds to an expected condition which is more slippery compared to the "perfect" condition of the model indicated with reference numeral 406. The torque limit is set, which is indicated by reference numeral 412. The torque limit is thus converted to a tyre force limit 412. Further, a slip limit 410 is generated, whereby the wheel is not allowed to exceed this slip limit.

As can be seen in FIG. 3, the actual tyre model 404 is located above the tyre model 402, i.e., the actual tyre force for a specific wheel slip is in reality higher than the tyre force of the generated tyre model 402. Thus, the vehicle is thus likely operated at a dry road surface and/or with no substantial steering input. The actuator 104 is controlled to generate a torque for operating the vehicle at a desired wheel speed/wheel slip 408. In the example in FIG. 3, the actuator 104 will operate at the torque limit 412 since the requested wheel slip will not be reached when driving at the relatively dry road surface. Thus, in the situation depicted in FIG. 3, the actuator 104 will be operated in the torque limit control mode. An operator of the vehicle 100 will thus receive the torque he/she requested, and the vehicle will be operated in a relatively smooth steady-state condition.

Turning to FIG. 4 which illustrates another operating scenario. As can be seen in FIG. 4, the actual tyre model 404 is located below the tyre model 402, i.e., the actual tyre force for a specific wheel slip is in reality lower than the tyre force of the generated tyre model 402. Thus, the vehicle is likely operated at a slippery road, and/or operated with large steering input, i.e., exposed to high lateral forces. In a similar vein as described above in relation to FIG. 3, the actuator 104 is controlled to generate a torque for operating the vehicle at the desired wheel speed/wheel slip 408. However, as the actual tyre model 404 is located below the generated tyre model 402, the desired wheel speed/wheel slip 408 will be reached before the actuator reaches the torque limit 412. In detail, the torque limit 412 will not be reached and the actuator 104 will be operated in a wheel speed control mode. In this case, wheel slip will be controlled in a proportional manner relative to a driver request and vehicle stability will be preserved.

The vehicle 100 may thus operate according to the example in FIG. 3, i.e., the actuator 104 is operated in the torque limit control mode, and when the vehicle thereafter suddenly drives over a strip of ice, the vehicle 100 is operated according to the example in FIG. 4, i.e., the actuator 104 is operated in the wheel speed control mode. Hence, a rapid change from the torque limit control mode to the wheel speed control mode is obtained, without any interaction from the vehicle motion management system 660.

Turning now to FIG. 5 which is a graph illustrating a still further example embodiment of a model representing a relationship between wheel slip and tyre forces. In particular, FIG. 5 depicts the use of a lower 402' and an upper 402" upper tyre model. The lower tyre model 402" represents e.g., a slippery road condition, while the upper tyre model 402' represents e.g., a dry road surface. In further detail, for a specific wheel slip value, a tyre force for the upper tyre model 402" is higher compared to a tyre force for the lower tyre model 402'.

The actuator 104 is controlled to generate a torque for operating the vehicle 100 at a desired wheel speed/wheel slip 408 in a similar vein as described above. However, the actuator torque is not allowed to either exceed an upper torque limit 412" defined by the upper tyre model 402" or fall below a lower torque limit 412' defined by the lower tyre model 402'. A torque request 409 is the example depicted in FIG. 5 as being somewhere between the upper 412" and lower 412' limits.

The upper 412" and lower 412' torque limits are defined for a given wheel speed/wheel slip from the upper 402" and lower 402' tyre model, respectively, and can be optionally adjusted by further equations, two alternatives of such adjustments are shown in equations (1)-(2) and (3)-(4). Equations (1)-(2) are adjusting the torque limits described above, based on a predetermined margin value, i.e. a value that defines a minimum operating band needed to be able to perform wheel speed control, while equation (3)-(4) are adjusting the torque limits on a functional safety torque value, i.e. a safety value defining a maximum operating band around any given torque request, considering aspects of vehicle safety.

$$T_{min} = \min(T_{412'}, T_{req} - T_{margin}) \quad (1)$$

$$T_{max} = \max(T_{412''}, T_{req} + T_{margin}) \quad (2)$$

$$T_{min} = \max(T_{min}, T_{req} - T_{funcSafety}) \quad (3)$$

$$T_{max} = \min(T_{min}, T_{req} + T_{funcSafety}) \quad (4)$$

where $T_{req}$ is the requested torque; and $T_{min}$ is a predetermined minimum torque.

Equations (1) and (2) is preferably applicable at operating conditions with low wheel slip, as $T_{min}$ and $T_{max}$ for low wheel slip will otherwise be substantially the same. Equations (3) and (4) include the operator $T_{funcSafety}$ which is a torque taking functional safety of the vehicle into account, such as e.g., vehicle speed, vehicle weight, etc.

Other alternatives of determining the upper and lower torque limits are also conceivable, such as, not necessarily taking a tyre model into account, to define the lower torque limit as the requested torque minus the torque margin, and the upper torque limit as the requested torque plus the torque margin.

Figure 8:
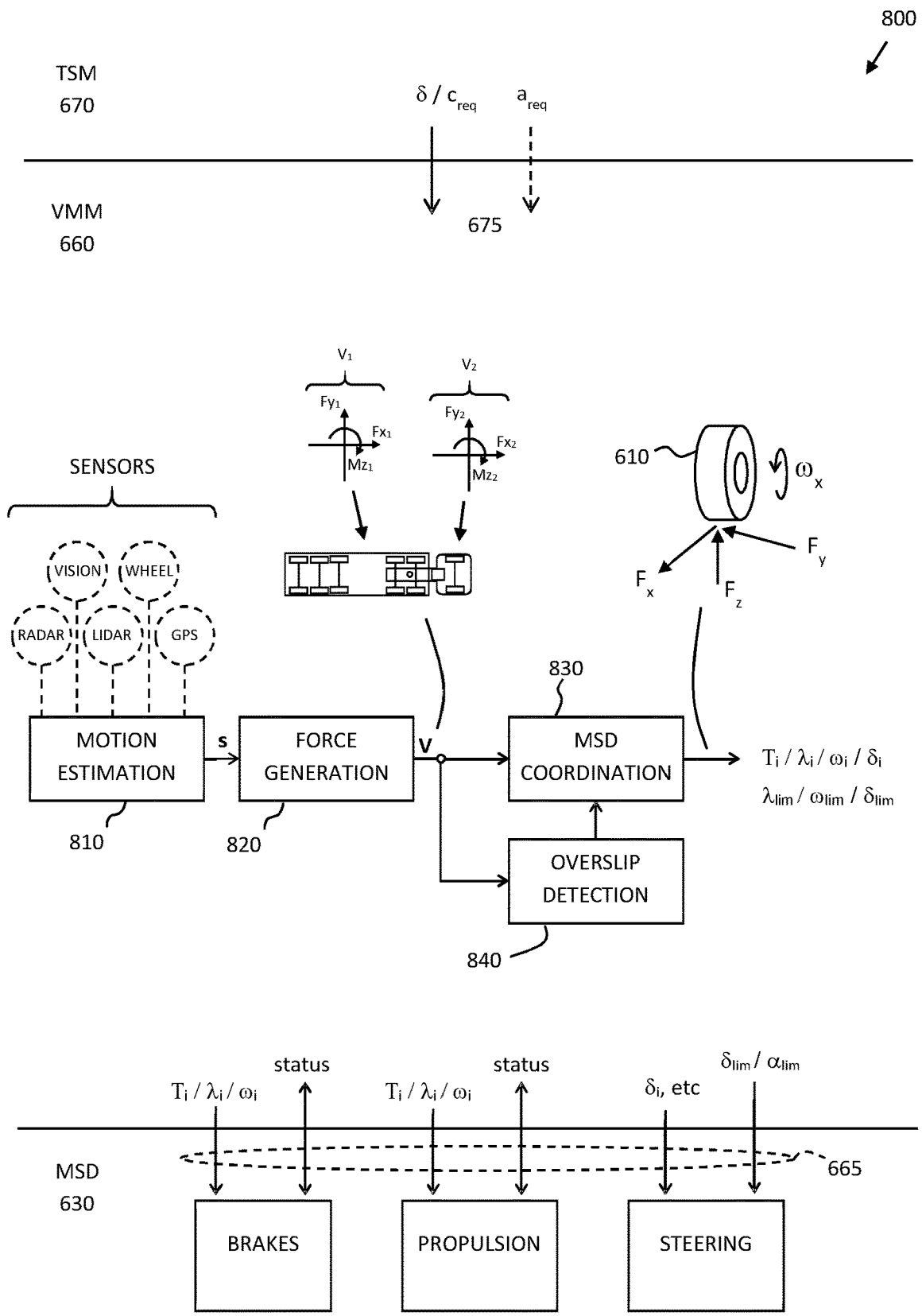
FIG. 8 illustrates an example vehicle control function architecture.

FIG. 8 illustrates an example vehicle control function architecture applicable with the herein disclosed methods, where the TSM function 670 generates vehicle motion requests 675, which may comprise a desired steering angle δ or an equivalent curvature $c_{req}$ to be followed by the vehicle, and which may also comprise desired vehicle unit accelerations $a_{req}$ and also other types of vehicle motion requests, which together describe a desired motion by the vehicle along a desired path at a desired velocity profile. It is understood that the motion requests can be used as base for determining or predicting a required amount of longitudinal and lateral forces which needs to be generated in order to successfully complete a maneuver.

The VMM function 660 operates with a time horizon of about 1 second or so, and continuously transforms the acceleration profiles $a_{req}$ and curvature profiles $c_{req}$ from the TSM function into control commands for controlling vehicle motion functions, actuated by the different MSDs of the vehicle 100 which report back capabilities to the VMM, which in turn are used as constraints in the vehicle control. The VMM function 660 performs vehicle state or motion estimation 810, i.e., the VMM function 660 continuously determines a vehicle state s comprising positions, speeds, accelerations, and articulation angles of the different units in the vehicle combination by monitoring operations using various sensors arranged on the vehicle 100, often but not always in connection to the MSDs.

The result of the motion estimation 810, i.e., the estimated vehicle state s, is input to a force generation module 820 which determines the required global forces $V=[V_1, V_2]$ for the different vehicle units to cause the vehicle 100 to move according to the requested acceleration and curvature profiles $a_{req}, c_{req}$, and to behave according to the desired vehicle behavior. The required global force vector V is input to an MSD coordination function 830 which allocates wheel forces and coordinates other MSDs such as steering and suspension. The MSD coordination function outputs an MSD control allocation for the i:th wheel, which may comprise any of a torque $T_i$, a longitudinal wheel slip $\lambda_i$, a wheel rotational speed $\omega_i$, and/or a wheel steering angle $\delta_i$. The coordinated MSDs then together provide the desired lateral Fy and longitudinal Fx forces on the vehicle units, as well as the required moments Mz, to obtain the desired motion by the vehicle combination 100. Notably, the MSD coordination function 830 may perform the type of torque filling operation discussed above ion connection to FIGS. 7A-C.

By determining vehicle unit motion using, e.g., global positioning systems, vision-based sensors, wheel speed sensors, radar sensors, steering angle sensors and/or lidar sensors, and translating this vehicle unit motion into a local coordinate system of a given wheel 610 (in terms of, e.g., longitudinal and lateral velocity components), it becomes possible to accurately estimate wheel slip in real time by comparing the vehicle unit motion in the wheel reference coordinate system to data obtained from the wheel speed sensor 650 arranged in connection to the wheel 610, as discussed above. A tyre model, which was discussed above in connection to FIG. 2 and FIGS. 3-5, can be used to translate between a desired longitudinal tyre force $Fx_i$ for a given wheel i and an equivalent longitudinal wheel slip $\lambda_i$ for the wheel.

An overslip detection module 840 is arranged to determine whether the speed-controlled MSDs on the vehicle are operating in a torque limited mode of operation or have reached their wheel slip requests. This overslip detection is then used to determine whether the torque filling operation is to be performed by requesting torques based on the torque limit or based on reported actual applied torque by the MSDs on the vehicle.

Thus, according to some aspects of the present disclosure, the VMM function 660 manages both force generation and MSD coordination, i.e., it determines what forces that are required at the vehicle units in order to fulfil the requests from the TSM function 670, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels. The forces are determined such as to generate the vehicle behavior which is expected by the TSM function in response to the control inputs generated by the TSM function 670.

Figure 9:
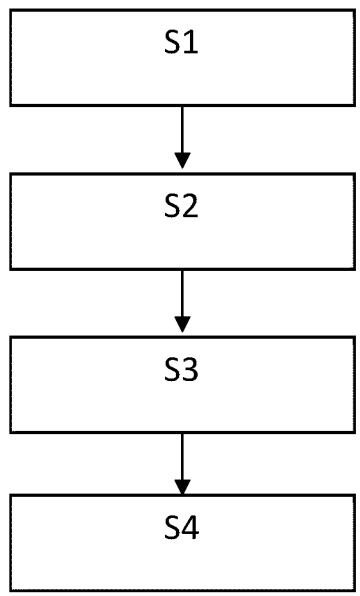
FIG. 9 is a flow chart illustrating methods.

In order to sum up, with reference to FIG. 9, there is disclosed herein a method for controlling the above-described actuator 104. As described above, a parameter value relating to the desired wheel force, such as e.g., a desired wheel torque, of at least one wheel 102 of the vehicle 100 is determined S1. The desired wheel force can be determined based on a requested demand from e.g., a vehicle operator, a system for autonomously controlling the vehicle, an ADAS system, etc. Based on the desired wheel force, a torque limit 412 is determined S2. Furthermore, a tyre model 402, as depicted in FIGS. 3-5, is determined S3 based on the relationship between the wheel forces and the wheel speed. Further, based on the tyre model 402, a parameter value relating to a desired wheel speed for the at least one wheel 102 is determined S4, whereby the actuator 104 is controlled S5 to generate an operating torque on the at least one wheel. The operating torque is subject to the determined torque limit and the desired wheel speed, i.e., the operating torque is thus not allowed to exceed the torque limit.

Figure 10:
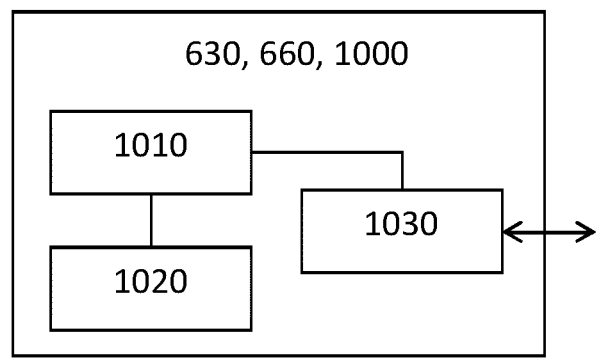
FIG. 10 schematically illustrates a control unit.

FIG. 10 schematically illustrates, in terms of a number of functional units, the components of a control unit 1000 according to embodiments of the discussions herein, such as any of the MSD control system 630 or the VMM system 660. Processing circuitry 1010 is provided using any combination of one or more of a suitable central processing unit CPU, multiprocessor, microcontroller, digital signal processor DSP, etc., capable of executing software instructions stored in a computer program product, e.g., in the form of a storage medium 1030. The processing circuitry 1010 may further be provided as at least one application specific integrated circuit ASIC, or field programmable gate array FPGA.

Particularly, the processing circuitry 1010 is configured to cause the control unit 1000 to perform a set of operations, or steps, such as the methods discussed in connection to FIG. 9 and generally herein. For example, the storage medium 1030 may store the set of operations, and the processing circuitry 1010 may be configured to retrieve the set of operations from the storage medium 1030 to cause the control unit 1000 to perform the set of operations. The set of operations may be provided as a set of executable instructions. Thus, the processing circuitry 1010 is thereby arranged to execute methods as herein disclosed.

The storage medium 1030 may also comprise persistent storage, which, for example, can be any single one or combination of magnetic memory, optical memory, solid state memory or even remotely mounted memory.

The control unit 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the control unit 1000, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

Figure 11:
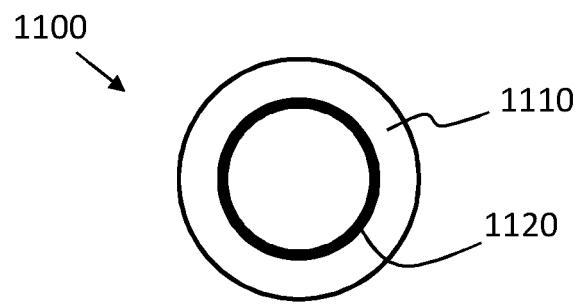
FIG. 11 shows an example computer program product.

FIG. 11 illustrates a computer readable medium 1110 carrying a computer program comprising program code means 1120 for performing the methods illustrated in FIG. 9 and the techniques discussed herein, when said program product is run on a computer. The computer readable medium and the code means may together form a computer program product 1100.

The invention claimed is:

1. A vehicle motion management, VMM, system for a heavy-duty vehicle, the VMM system being connectable to a motion support device, MSD, control system for communication of control signals therebetween, wherein the VMM system is configured to:
   obtain a parameter value relating to a desired wheel force of at least one wheel of the vehicle;
   determine a torque limit for a first MSD associated with the at least one wheel based on the parameter value relating to the desired wheel force;
   determine a tire model based on a relationship between wheel force and wheel speed of the at least one wheel;
   determine a parameter value relating to a desired wheel speed for the first MSD associated with the at least one wheel based on the tire model;
   determine a torque fill request for a second MSD of the heavy-duty vehicle based on the desired wheel force and on a torque capability of the first MSD; and
   transmit a control signal to the MSD control system, the control signal being arranged to, when executed by the MSD control system, cause the MSD control system to generate an operating torque by the first MSD to be executed subject to the torque limit and the desired wheel speed, and to generate an operating torque by the second MSD to be executed subject to the torque fill request,
wherein the VMM system is further configured to:
   receive a limit status signal associated with the first MSD indicative of if the operating torque of the first MSD is limited by the torque limit, and to
   determine the torque fill request for the second MSD in dependence of the torque limit for the first MSD in case the operating torque of the first MSD is limited by the torque limit, and to determine the torque fill request for the second MSD in dependence of an applied torque status signal received from the first MSD in case the operating torque of the first MSD is not limited by the torque limit.

2. The VMM system according to claim 1, wherein the limit status signal associated with the first MSD comprises an indication of if the first MSD is operating in a speed limited mode of operation.

3. The VMM system according to claim 1, wherein the limit status signal associated with the first MSD comprises an indication of if the first MSD is operating at a motor axle speed within a predetermined margin from a requested motor axle speed.

4. The VMM system according to claim 1, wherein the limit status signal associated with the first MSD is configured to account for operation at vehicle speeds below a low speed threshold.

5. The VMM system according to claim 1, wherein the tire model is based on a predetermined characteristic value of the at least one wheel.

6. The VMM system according to claim 1, wherein the tire model is based on a relationship between wheel force and wheel speed for a predetermined wheel characteristic of the at least one wheel.

7. The VMM system according to claim 1, wherein the tire model is based on a safety parameter indicative of a current operating condition of the vehicle.

8. The VMM system according to claim 1, wherein the parameter relating to the desired wheel speed is a desired wheel slip parameter.

9. The VMM system according to claim 1, wherein the torque limit is determined independently from the determined tire model.

10. The VMM system according to claim 1, wherein the tire model is a first tire model, the VMM system being configured to:
    determine a second tire model, the second tire model is based on an increased wheel force compared to the first tire model for respective wheel speeds.

11. The VMM system according to claim 10, wherein the torque limit is a first torque limit, the VMM system being configured to:
    determine a second torque limit relating to a desired wheel speed based on the second tire model;
wherein the transmitted control signal is arranged to, when executed by the MSD control system, cause the MSD control system to generate the operating torque to be executed subject to the desired wheel speed and the first and second torque limits.

12. The VMM system according to claim 10, wherein the first and second tire models are determined based on a predetermined range between wheel force values for a specific wheel speed.

* * * * *